United States Patent
Murase

(10) Patent No.: US 9,718,377 B2
(45) Date of Patent: Aug. 1, 2017

(54) ELECTRICALLY DRIVEN VEHICLE

(71) Applicant: HONDA MOTOR CO., LTD., Tokyo (JP)

(72) Inventor: Hiroyuki Murase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/182,607

(22) Filed: Jun. 15, 2016

(65) Prior Publication Data

US 2016/0368394 A1 Dec. 22, 2016

(30) Foreign Application Priority Data

Jun. 17, 2015 (JP) .................................. 2015-121829

(51) Int. Cl.
  *B60L 15/00* (2006.01)
  *B60K 6/40* (2007.10)
  *H01M 2/10* (2006.01)

(52) U.S. Cl.
  CPC .............. *B60L 15/007* (2013.01); *B60K 6/40* (2013.01); *H01M 2/1083* (2013.01); *B60L 2210/10* (2013.01); *B60Y 2200/92* (2013.01); *B60Y 2400/61* (2013.01); *H01M 2/1077* (2013.01); *Y10S 903/951* (2013.01)

(58) Field of Classification Search
  CPC ................. B60R 16/04; Y02E 60/12
  See application file for complete search history.

(56) References Cited

U.S. PATENT DOCUMENTS

| | | | | |
|---|---|---|---|---|
| 6,386,611 B1 * | 5/2002 | Buchfink | ................ | B60R 11/02 |
| | | | | 296/187.08 |
| 2003/0089540 A1 * | 5/2003 | Koike | ................. | H01M 2/1055 |
| | | | | 180/68.5 |
| 2012/0031695 A1 * | 2/2012 | Tsuchiya | ................. | B60K 1/04 |
| | | | | 180/68.5 |

FOREIGN PATENT DOCUMENTS

JP            5494499 B2        8/2012

* cited by examiner

*Primary Examiner* — John Walters
*Assistant Examiner* — James Triggs
(74) *Attorney, Agent, or Firm* — Mori & Ward, LLP

(57) ABSTRACT

An electrically driven vehicle includes a vehicle frame, an electrical unit, a first fixing member, and a second fixing member. The vehicle frame includes a lower frame and an upper frame. The electrical unit is connected to the lower frame and the upper frame. A lower portion of the electrical unit is connected to the lower frame with a first holding force in a vehicle up-down direction via a first fixing member. An upper portion of the electrical unit is connected to the upper frame with a second holding force in a vehicle front-rear direction via a second fixing member. The second holding force is smaller than the first holding force. The second fixing member is provided at a position in which a load applied in the vehicle front-rear direction is exerted to the second fixing member more than to the first fixing member.

4 Claims, 6 Drawing Sheets

ELECTRICALLY DRIVEN VEHICLE

CROSS-REFERENCE TO RELATED APPLICATIONS

The present application claims priority under 35 U.S.C. §119 to Japanese Patent Application No. 2015-121829, filed Jun. 17, 2015, entitled "Electrically Driven Vehicle." The contents of this application are incorporated herein by reference in their entirety.

BACKGROUND

1. Field

The present disclosure relates to an electrically driven vehicle.

2. Description of the Related Art

For example, an electrically driven vehicle such as a hybrid vehicle or an EV includes plural high-voltage electrical apparatuses (high-voltage apparatuses) such as an inverter that controls a traction motor and a DC-DC converter for voltage control. In the electrically driven vehicle, in a case where an external load is applied as in collision of the vehicle, for example, it is desired to protect the high-voltage electrical apparatuses from the external load.

For example, Japanese Patent No. 5494499 discloses an electrically driven vehicle. In this electrically driven vehicle, in a case where a collision load is applied to a rigid member from the front toward the rear in a forward collision of the vehicle, the load is transmitted to a portion that is higher than an output shaft of a drive unit via the rigid member.

Thus, the drive unit rotates upward with a third coupling mechanism that is coupled with a lower portion in the rear of the drive unit serving as the fulcrum. Accordingly, the load from the front, which is applied to the drive unit, may be split into a load to the rear of the vehicle and an upward load. Japanese Patent No. 5494499 discloses that this enables the load that is transmitted from the drive unit toward a vehicle interior to be reduced to a low load and enables a frame member and so forth to certainly absorb the load.

SUMMARY

According to one aspect of the present invention, an electrically driven vehicle in which an electrical unit that is provided with high-voltage apparatuses is fixed to a lower frame and an upper frame that configure a vehicle frame, the electrically driven vehicle includes a first fixing point and a second fixing point. The first fixing point fixes a lower portion of the electrical unit to the lower frame. The second fixing point fixes an upper portion of the electrical unit to the upper frame. The first fixing point is fixed in a vehicle up-down direction with respect to the lower frame. The second fixing point is fixed in a vehicle front-rear direction with respect to the upper frame and provided with a holding force that is set lower than the first fixing point. The second fixing point in the electrical unit is set to a position in which a load is more easily exerted than the first fixing point in a case where the load is applied in the vehicle front-rear direction.

According to another aspect of the present invention, an electrically driven vehicle includes a vehicle frame, an electrical unit, a first fixing member, and a second fixing member. The vehicle frame includes a lower frame and an upper frame provided above the lower frame in a vehicle up-down direction. The electrical unit is connected to the lower frame and the upper frame. A lower portion of the electrical unit is connected to the lower frame with a first holding force in the vehicle up-down direction via a first fixing member. An upper portion of the electrical unit is connected to the upper frame with a second holding force in a vehicle front-rear direction substantially perpendicular to the vehicle up-down direction via a second fixing member. The second holding force is smaller than the first holding force. The second fixing member is provided at a position in which a load applied in the vehicle front-rear direction is exerted to the second fixing member more than to the first fixing member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
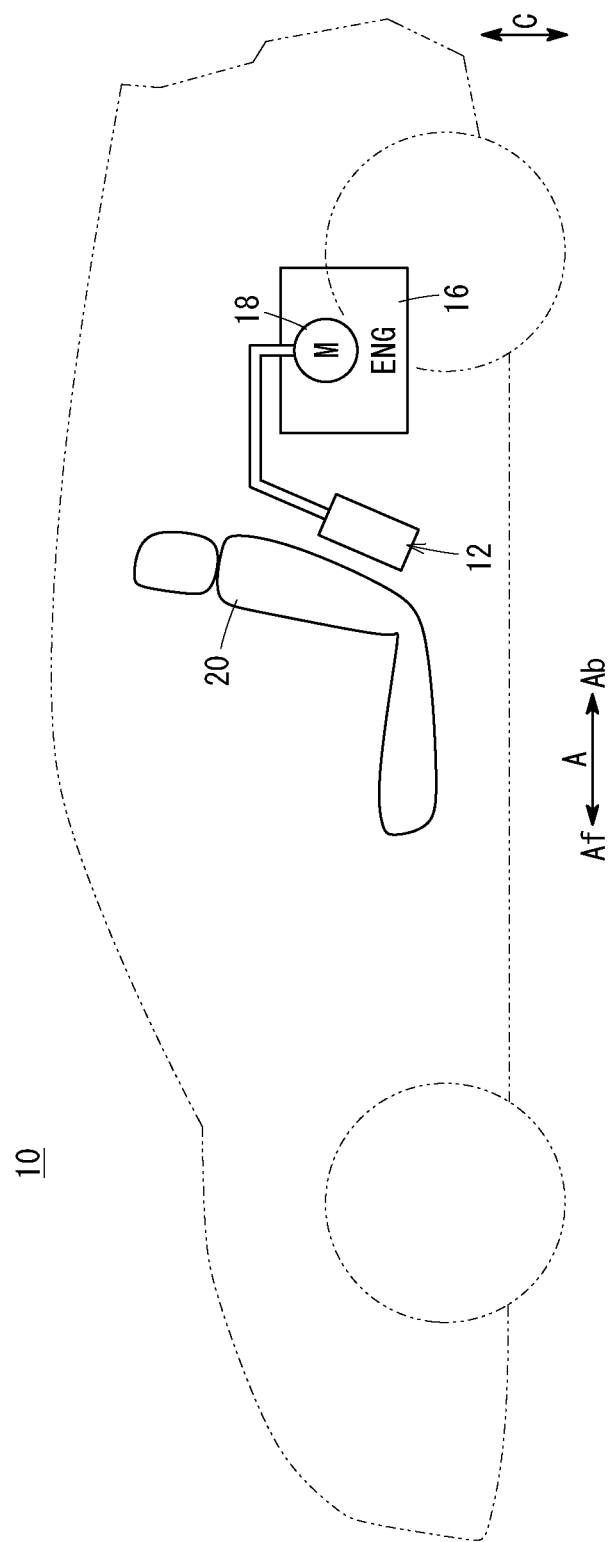
FIG. 1 is a schematic side view of an electrically driven vehicle according to an embodiment of the present disclosure.

The embodiments will now be described with reference to the accompanying drawings, wherein like reference numerals designate corresponding or identical elements throughout the various drawings.

As illustrated in FIG. 1, an electrical unit 12 is installed in an electrically driven vehicle 10 according to an embodiment of the present disclosure.

The electrically driven vehicle 10 is a hybrid vehicle, an EV, or the like, for example. An engine 16 and a motor 18 are coupled together. The engine 16 and the motor 18 are provided in the rear of a seat 20 (in the arrow Ab direction) (in the rear in the arrow A direction that is the vehicle longitudinal direction) but may be provided in a front box in the front in the vehicle longitudinal direction (in the arrow Af direction). The motor 18 is a three-phase DC brushless motor, for example.

Figure 2:
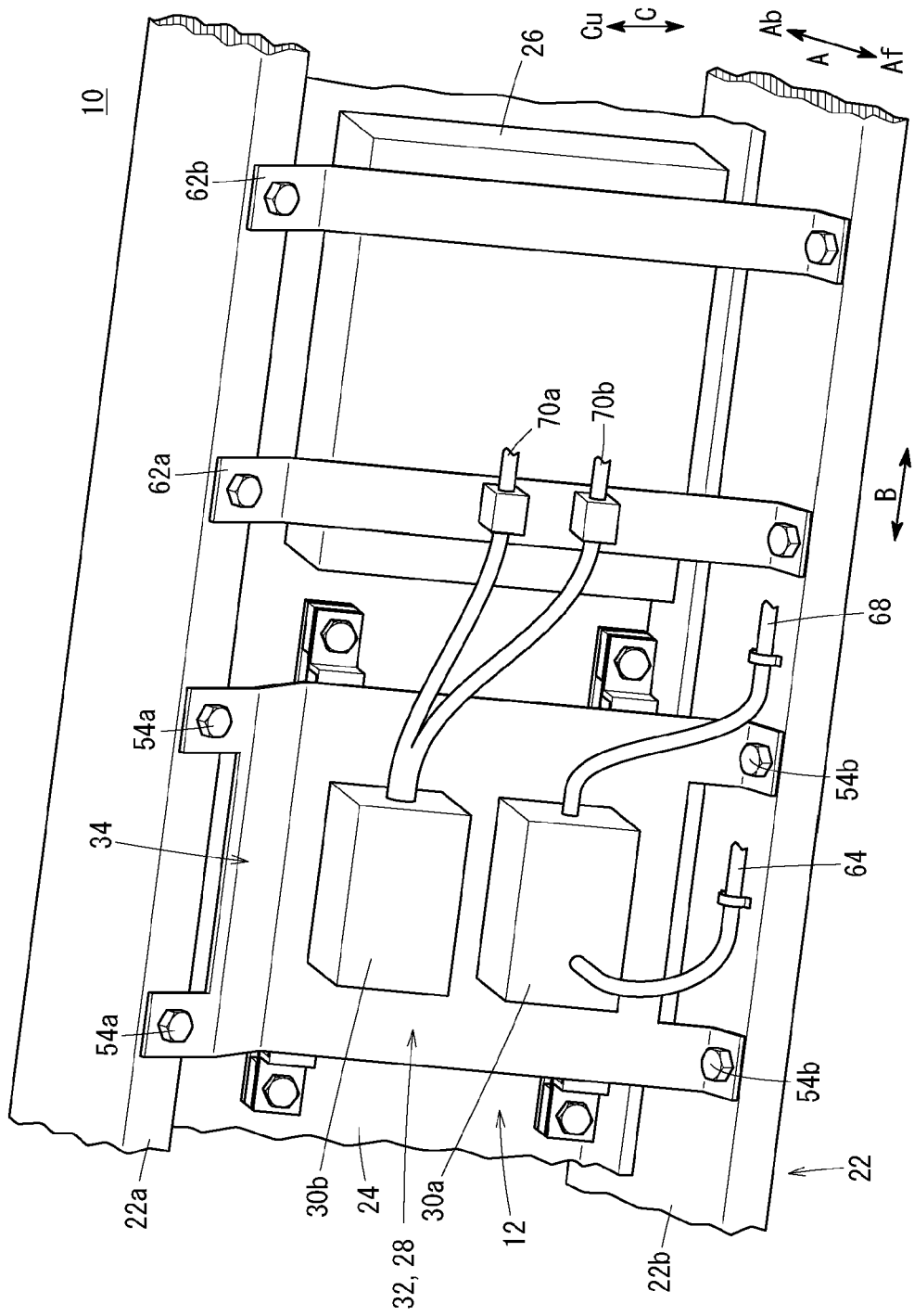
FIG. 2 is a perspective explanation diagram of principal components of the electrically driven vehicle.
Figure 3:
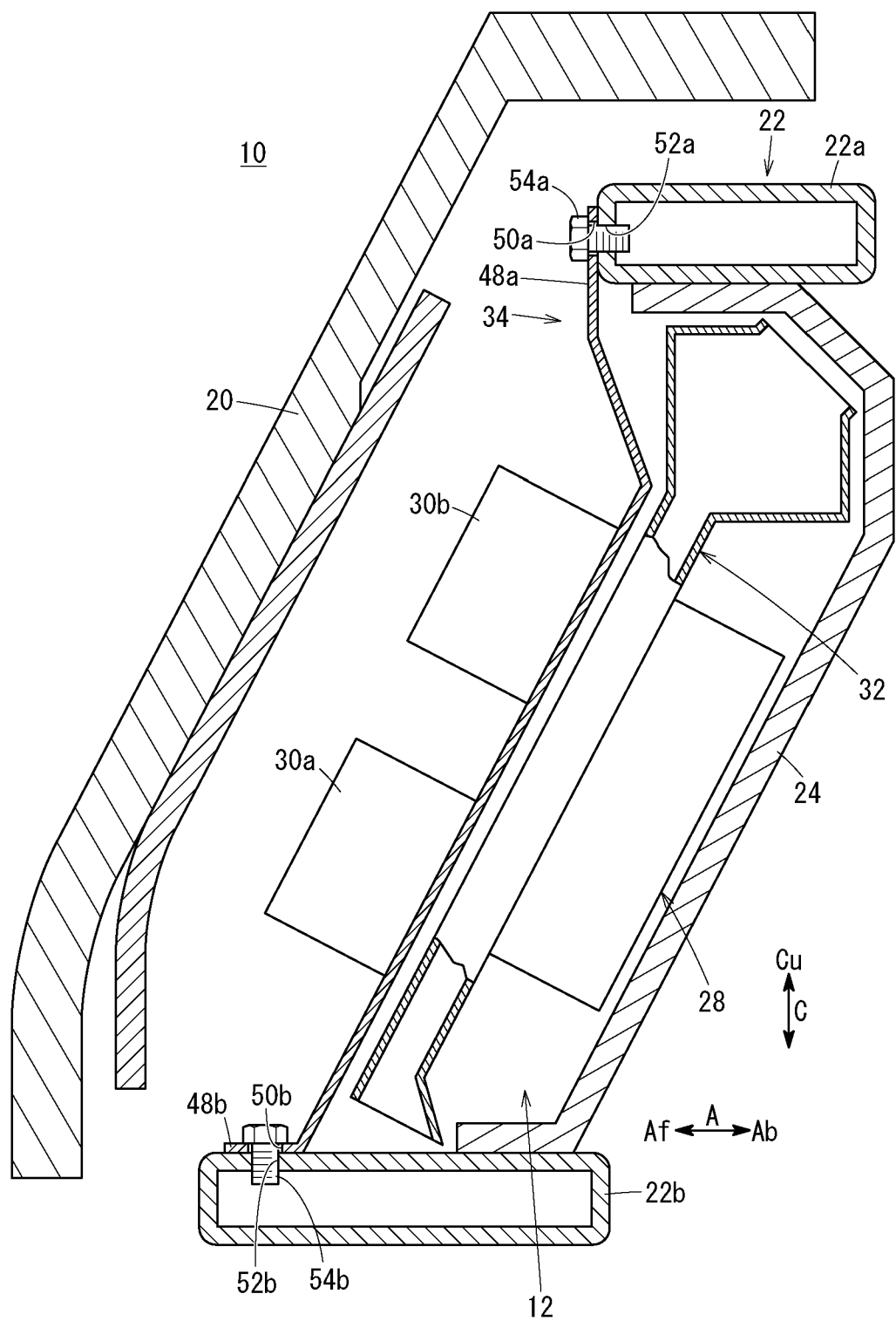
FIG. 3 is a cross-sectional side view of principal components of the electrically driven vehicle.

As illustrated in FIGS. 2 and 3, the electrically driven vehicle 10 is provided with a vehicle frame 22 in the rear of the seat 20. The vehicle frame 22 has an upper frame 22a and a lower frame 22b, each of which extends in the vehicle width direction (the arrow B direction in FIG. 2). An electrical component box 24 is arranged between the upper frame 22a and the lower frame 22b. The electrical component box 24 houses the electrical unit 12 and a battery module 26 (see FIG. 2). The electrical component box 24 is employed as needed and may not have to be used.

Figure 4:
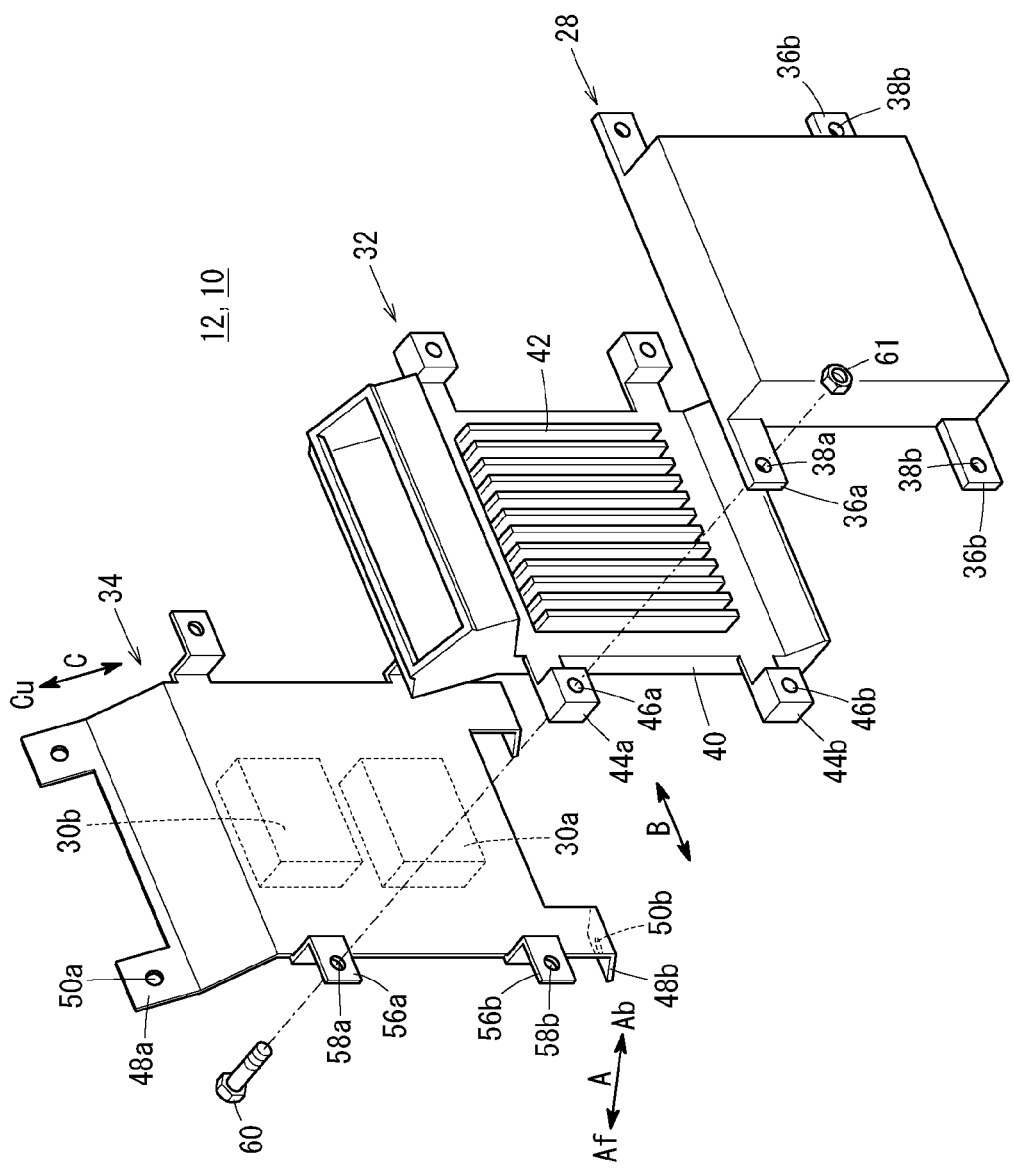
FIG. 4 is a perspective explanation diagram of the electrically driven vehicle, in which principal components are exploded.

As illustrated in FIGS. 3 and 4, the electrical unit 12 includes plural high-voltage electrical apparatuses (high-voltage apparatuses) such as a DC-DC converter 28 and junction boxes (junction boards) 30a and 30b, for example, and high-voltage electrical apparatuses in addition, which are not illustrated. The electrical unit 12 is provided with a cooling structure 32 and is fixed to the vehicle frame 22 via a bracket 34 (see FIGS. 2 and 3). In the electrical unit 12, the junction boxes 30a and 30b, the bracket 34, the cooling structure 32, and the DC-DC converter 28 are arranged rearward from the seat 20 side (in the arrow Ab direction) in this order (see FIG. 3).

As illustrated in FIG. 4, mount portions 36a and 36b are formed to swell out at both ends of the DC-DC converter 28 in the vehicle width direction (the arrow B direction). The mount portions 36a and 36b are in plate shapes and are respectively provided with hole portions 38a and 38b.

The cooling structure 32 has a duct member 40 that is formed of a non-metal material, for example, a resin material. The DC-DC converter 28 is provided with plural cooling fins 42. The cooling fins 42 are arranged in the duct member 40. Mount portions 44a and 44b are formed to swell out at both ends of the duct member 40 in the vehicle width direction (the arrow B direction). The mount portions 44a and 44b are in block shapes and are respectively provided with hole portions 46a and 46b.

The bracket 34 is in a plate shape, and a pair of upper side fixing portions 48a is formed in upper portions of the bracket 34. The upper side fixing portion 48a is inclined forward at a relatively small angle and is provided with a hole portion 50a. A pair of lower side fixing portions 48b is formed in lower portions of the bracket 34. The lower side fixing portion 48b is inclined forward at a relatively large angle and is provided with a hole portion 50b. In a case where the bracket 34 is fixed to the vehicle frame 22, the upper side fixing portions 48a are arranged to be parallel with the horizontal direction (the arrow A direction), and the lower side fixing portions 48b are arranged to be parallel with the vertical direction (the arrow C direction).

As illustrated in FIG. 3, in the upper frame 22a, a pair of threaded holes 52a is formed coaxially with the pair of the hole portions 50a and to be directed in the horizontal direction. In the lower frame 22b, a pair of threaded holes 52b is formed coaxially with the pair of the hole portions 50b and to be directed in the vertical direction.

Fixing bolts (second fixing bolts) 54a are inserted in the hole portions 50a of the bracket 34 and screwed with the threaded holes 52a of the upper frame 22a, and the upper portion of the bracket 34 is thereby fixed to the upper frame 22a. Fixing bolts (first fixing bolts) 54b are inserted in the hole portions 50b of the bracket 34 and screwed with the threaded holes 52b of the lower frame 22b, and the lower portion of the bracket 34 is thereby fixed to the lower frame 22b.

The fixing bolt 54b configures a first fixing point that fixes a lower portion of the electrical unit 12 to the lower frame 22b. The fixing bolt 54b is fastened toward the vehicle down direction (the arrow C direction). The fixing bolt 54a configures a second fixing point that fixes an upper portion of the electrical unit 12 to the upper frame 22a. The fixing bolt 54a is fastened toward the vehicle rear direction (the arrow Ab direction).

While the fixing bolt 54b is fixed in the vehicle up-down direction with respect to the lower frame 22b, the fixing bolt 54a is fixed in the vehicle front-rear direction with respect to the upper frame 22a. The holding force of the fixing bolt 54b is set to a lower holding force than the fixing bolt 54a. In the electrical unit 12, the fixing bolt 54b is set in a position in which a load is more easily exerted than the fixing bolt 54a in a case where the load is applied in the vehicle front-rear direction.

Specifically, the electrical unit 12 is fixed toward the vehicle up direction (the arrow Cu direction) in a position in which the electrical unit 12 is inclined in the vehicle rear direction (the arrow Ab direction), and the fixing bolts 54a are arranged in the rear of the fixing bolts 54b in the vehicle.

Figure 5:
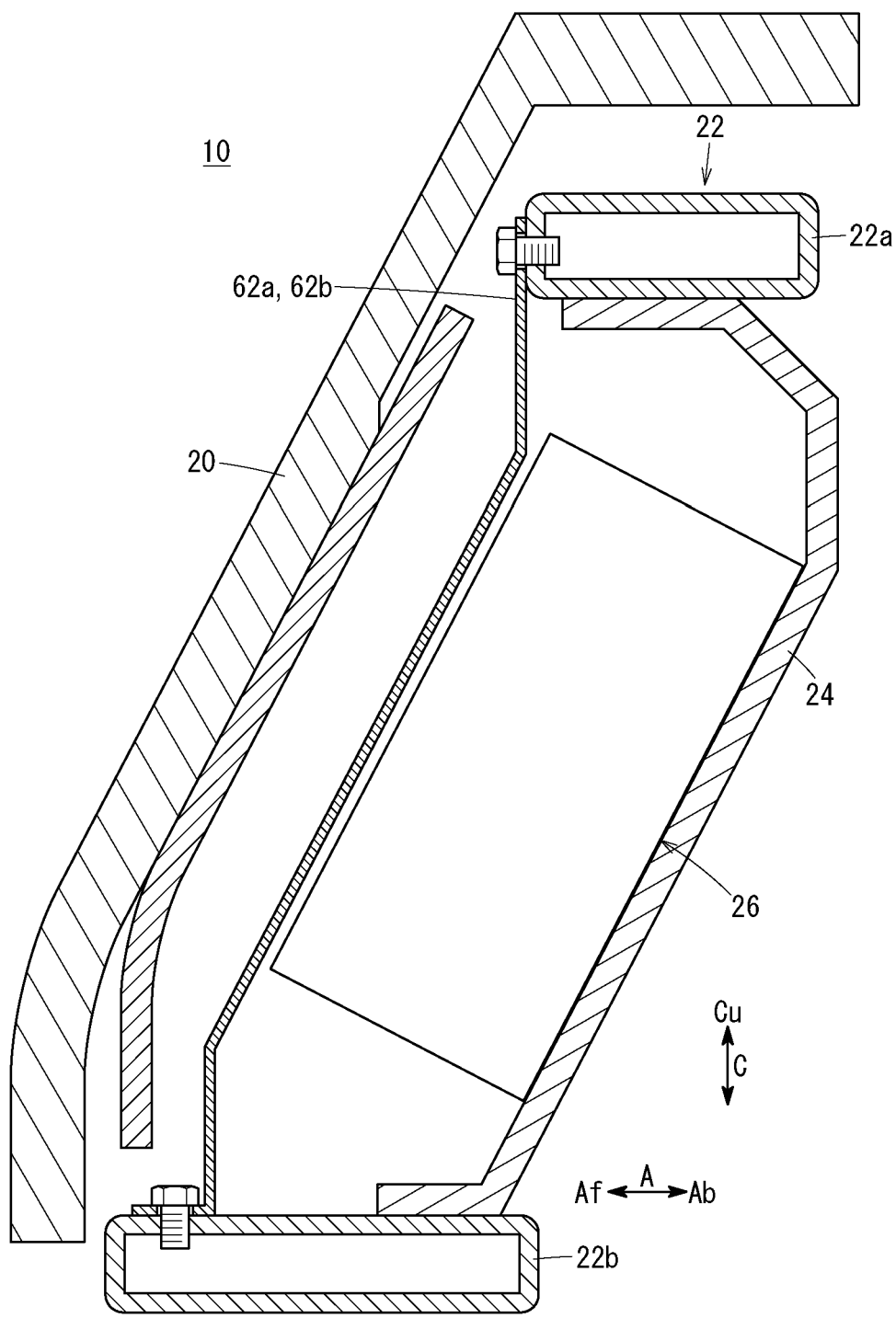
FIG. 5 is a cross-sectional view of a battery module with which the electrically driven vehicle is configured.

As illustrated in FIG. 4, mount portions 56a and 56b are formed to swell out at both ends of the bracket 34 in the vehicle width direction (the arrow B direction). The mount portions 56a and 56b are in plate shapes and are respectively provided with hole portions 58a and 58b. As illustrated in FIGS. 4 and 5, two bolts 60 are inserted in the hole portions 58a, 46a, and 38a, and nuts 61 are screwed with ends of the bolts 60. The two other bolts 60 are inserted in the hole portions 58b, 46b, and 38b, and the nuts 61 are screwed with ends of the bolts 60. The DC-DC converter 28 is integrally fastened to the bracket 34 together with the duct member 40 by the same bolts 60.

As illustrated in FIGS. 2 and 5, the battery module 26 is fastened by the screws to the upper frame 22a and the lower frame 22b via bracket members 62a and 62b and is thereby fixed to the vehicle frame 22. The battery module 26 is configured by laminating high-voltage batteries and thinly arranged (see FIG. 5). The electrical unit 12 is thinly arranged similarly (see FIG. 3).

The junction box 30a is provided with a DC cable 64 that is connected with the DC-DC converter 28 and an inverter (another electrical apparatus), which is not illustrated. The junction box 30a is provided with a cable 68, which is connected with an air conditioner and so forth, which are not illustrated. The junction box 30b is provided with battery cables 70a and 70b that are connected with the battery module 26.

In the electrically driven vehicle 10 configured as described above, as illustrated in FIG. 3, the fixing bolt 54b configures the first fixing point that fixes the lower portion of the electrical unit 12 to the lower frame 22b and is fixed in the vehicle up-down direction with respect to the lower frame 22b. The fixing bolt 54a configures the second fixing point that fixes the upper portion of the electrical unit 12 to the upper frame 22a and is fixed in the vehicle front-rear direction with respect to the upper frame 22a.

The holding force of the fixing bolt 54b is set to a lower holding force than the fixing bolt 54a. Further, in the electrical unit 12, the fixing bolt 54b is set in a position in which a load is more easily exerted than the fixing bolt 54a in a case where the load is applied in the vehicle front-rear direction.

Figure 6:
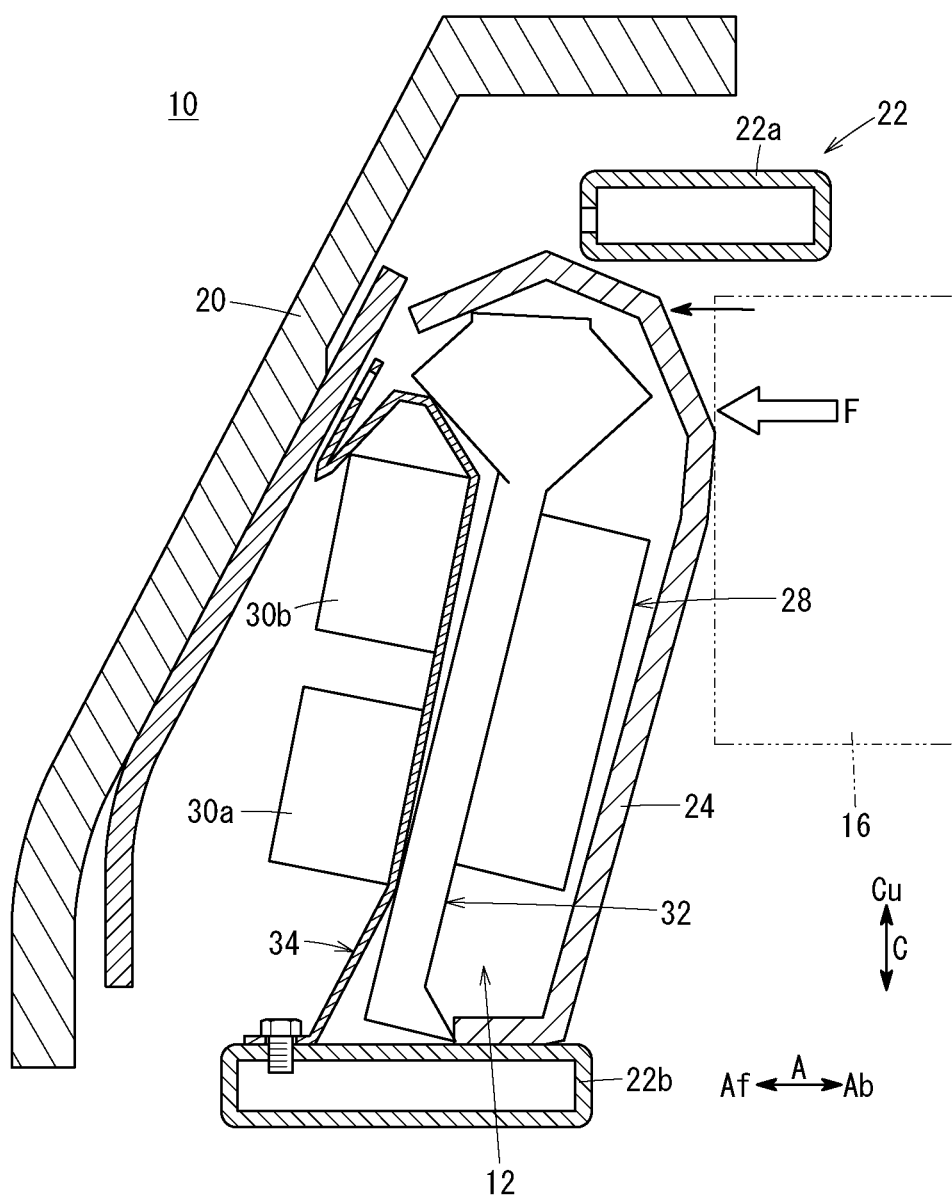
FIG. 6 is an action explanation diagram of the electrically driven vehicle.

Thus, as illustrated in FIG. 6, in a case where an external load (an impact load from an external portion) F is applied from the vehicle rear direction and where the engine 16 contacts with the electrical unit 12, a fixing function of the fixing bolt 54b is released prior to the fixing bolt 54a. Accordingly, only the lower portion of the electrical unit 12 is held by the fixing bolts 54a, and the electrical unit 12 may thus rotate in the vehicle front direction with the lower portion serving as the fulcrum.

Consequently, a separate dedicated mechanism does not have to be provided for allowing the electrical unit 12 to rotate, and direct application of the external load F to the electrical unit 12 may properly be inhibited in an economical and compact configuration.

The present disclosure relates to an electrically driven vehicle in which an electrical unit provided with high-voltage apparatuses is fixed to a lower frame and an upper frame that configure a vehicle frame. The electrically driven vehicle includes a first fixing point that fixes a lower portion of the electrical unit to the lower frame, and a second fixing point that fixes an upper portion of the electrical unit to the upper frame.

The first fixing point is fixed in a vehicle up-down direction with respect to the lower frame, and the second fixing point is fixed in a vehicle front-rear direction with respect to the upper frame and provided with a holding force that is set lower than the first fixing point. Further, the second fixing point in the electrical unit is set to a position in which a load is more easily exerted than the first fixing point in a case where the load is applied in the vehicle front-rear direction.

Further, the first fixing point preferably includes a first fixing bolt, and the first fixing bolt is preferably fastened toward a vehicle down direction. The second fixing point preferably includes a second fixing bolt, and the second fixing bolt is preferably fastened toward a vehicle rear direction.

In addition, the electrical unit is preferably fixed to the vehicle frame toward a vehicle up direction in a position in which the electrical unit is inclined in the vehicle rear direction.

In the present disclosure, a fixing function of the second fixing point is released prior to the first fixing point in a case where a load is applied in the vehicle front-rear direction. Thus, only the lower portion of the electrical unit is held by the first fixing point, and the electrical unit may thus rotate in the vehicle front-rear direction with the lower portion serving as the fulcrum.

Accordingly, a separate dedicated mechanism does not have to be provided for allowing the electrical unit to rotate. Consequently, direct application of the external load to the electrical unit provided with high-voltage apparatuses may properly be inhibited in an economical and compact configuration.

Obviously, numerous modifications and variations of the present invention are possible in light of the above teachings. It is therefore to be understood that within the scope of the appended claims, the invention may be practiced otherwise than as specifically described herein.

What is claimed is:

1. An electrically driven vehicle comprising:
    a vehicle frame comprising:
        a lower frame; and
        an upper frame provided above the lower frame in a vehicle up-down direction;
    a bracket;
    an electrical unit connected to the lower frame and the upper frame by the bracket;
    a first fixing member via which a lower portion of the electrical unit is connected to the lower frame via the bracket with a first holding force in the vehicle up-down direction; and
    a second fixing member via which an upper portion of the electrical unit is connected to the upper frame via the bracket with a second holding force in a vehicle front-rear direction substantially perpendicular to the vehicle up-down direction, the second holding force being smaller than the first holding force, the second fixing member being provided at a position in which a load applied in the vehicle front-rear direction is exerted to the second fixing member more than to the first fixing member,
    wherein the bracket is fixed to the lower frame by the first fixing member, and the bracket is fixed to the upper frame by the second fixing member.

2. The electrically driven vehicle according to claim 1, wherein the first fixing member includes a first fixing bolt, the first fixing bolt is fastened toward a vehicle down direction, the second fixing member includes a second fixing bolt, and the second fixing bolt is fastened toward a vehicle rear direction.

3. The electrically driven vehicle according to claim 1, wherein the electrical unit is fixed to the vehicle frame toward a vehicle up direction in a position in which the electrical unit is inclined in the vehicle rear direction.

4. The electrically driven vehicle according to claim 1, wherein the first fixing member includes a first fixing bolt, the first fixing bolt longitudinally extends in a vehicle down direction, the second fixing member includes a second fixing bolt, and the second fixing bolt longitudinally extends in a vehicle rear direction substantially perpendicular to the first fixing bolt.

* * * * *